United States Patent
Yeo et al.

(10) Patent No.: US 10,524,248 B2
(45) Date of Patent: Dec. 31, 2019

(54) METHOD AND APPARATUS FOR DETECTING DOWNLINK CONTROL SIGNAL IN WIRELESS COMMUNICATION SYSTEM

(71) Applicant: Samsung Electronics Co., Ltd., Gyeonggi-do (KR)

(72) Inventors: Jeongho Yeo, Gyeonggi-do (KR); Jinyoung Oh, Seoul (KR); Sungjin Park, Incheon (KR)

(73) Assignee: Samsung Electronics Co., Ltd (KR)

( * ) Notice: Subject to any disclaimer, the term of this patent is extended or adjusted under 35 U.S.C. 154(b) by 16 days.

(21) Appl. No.: 15/935,873

(22) Filed: Mar. 26, 2018

(65) Prior Publication Data
US 2018/0279276 A1    Sep. 27, 2018

(30) Foreign Application Priority Data
Mar. 24, 2017   (KR) .......................... 10-2017-0037909

(51) Int. Cl.
*H04W 72/04*    (2009.01)

(52) U.S. Cl.
CPC ..... *H04W 72/042* (2013.01); *H04W 72/0446* (2013.01)

(58) Field of Classification Search
CPC ........................ H04W 72/042; H04W 72/0446
USPC ........................................................ 370/329
See application file for complete search history.

(56) References Cited

U.S. PATENT DOCUMENTS

| | | | |
|---|---|---|---|
| 9,124,406 B2 | 9/2015 | Chen et al. | |
| 9,807,737 B2 * | 10/2017 | Yang .......................... | H04L 5/00 |
| 2013/0195041 A1 | 8/2013 | Papasakellariou et al. | |
| 2013/0223378 A1 | 8/2013 | Gao et al. | |

(Continued)

FOREIGN PATENT DOCUMENTS

| | | |
|---|---|---|
| EP | 2 675 198 | 12/2013 |
| KR | 1020130086990 | 8/2013 |

OTHER PUBLICATIONS

International Search Report dated Jun. 25, 2018 issued in counterpart application No. PCT/KR2018/003511, 4 pages.

*Primary Examiner* — Faisal Choudhury
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of things (IoT). The present disclosure may be applied to intelligent services based on the 5G communication technology and the IoT-related technology, such as smart home, smart building, smart city, smart car, connected car, health care, digital education, smart retail, security and safety services. A method by a terminal in a mobile communication system is provided. The method includes receiving configuration information corresponding to a transmission mode; receiving first downlink control information on a first subframe; omitting acquisition of second downlink control information using a second scheme, if the first downlink control information is acquired based on the first scheme; and transmitting information corresponding to the first downlink control information on a subframe corresponding to the first downlink control information.

20 Claims, 12 Drawing Sheets

(56) References Cited

U.S. PATENT DOCUMENTS

| | | | |
|---|---|---|---|
| 2015/0063241 A1* | 3/2015 | Shimezawa | H04W 72/042 370/329 |
| 2015/0296513 A1 | 10/2015 | Nogami et al. | |
| 2016/0119904 A1* | 4/2016 | Feng | H04L 5/001 370/329 |
| 2016/0278054 A1* | 9/2016 | You | H04L 5/0053 |
| 2016/0374084 A1 | 12/2016 | Zhang | |
| 2019/0174529 A1* | 6/2019 | Tie | H04W 72/1289 |

* cited by examiner

METHOD AND APPARATUS FOR DETECTING DOWNLINK CONTROL SIGNAL IN WIRELESS COMMUNICATION SYSTEM

CROSS-REFERENCE TO RELATED APPLICATION(S)

This application is based on and claims priority under 35 U.S.C. § 119 to Korean Patent Application No. 10-2017-0037909, filed on Mar. 24, 2017, in the Korean Intellectual Property Office, the disclosure of which is incorporated herein by reference in its entirety.

BACKGROUND

1. Field

The present disclosure relates to a method and apparatus for detecting a downlink control signal in a wireless communication system, and more particularly, the present disclosure relates to a method and apparatus for detecting a downlink control signal from a specific search space in a terminal configured with a latency reduction mode.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands (e.g., 60 GHz bands) so as to accomplish higher data rates. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-Ppoints (CoMP), and reception-end interference cancellation. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the Big Data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

Wireless data traffic has increased since the deployment of fourth generation (4G) communication systems, and to meet demand, efforts have been made to develop an improved fifth generation (5G) or pre-5G communication system. Therefore, the 5G or pre-5G communication system is also called a "beyond 4G network" or a "post long term evolution (LTE) system".

The 5G communication system is implemented in higher frequency (mmWave) bands (e.g., 60 GHz bands) so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, and large scale antenna techniques are discussed in 5G communication systems.

In addition, in 5G communication systems, system network improvement development is under way based on advanced small cells, cloud radio access networks (RANs), ultra-dense networks, device-to-device (D2D) communication, wireless backhaul, moving networks, cooperative communication, coordinated multi-points (CoMP), and reception-end interference cancellation.

In the 5G system, hybrid frequency shift keying (FSK), quadrature amplitude modulation (QAM), frequency QAM (FQAM), sliding window superposition coding (SWSC) as an advanced coding modulation (ACM), filter bank multi carrier (FBMC), non-orthogonal multiple access (NOMA), and sparse code multiple access (SCMA) as an advanced access technology have been developed.

According to such improvements of the communication systems, a method for reducing the signal transmission/reception latency between communication nodes is required.

SUMMARY

Embodiments of the present disclosure are to address at least the above-mentioned problems and/or disadvantages and to provide at least the advantages described below.

In accordance with an aspect of the present disclosure, it is possible to effectively transmit and receive control information between a base station and a terminal in a communication system. In addition, a control signal decoding method and a relevant transmission/reception method may be provided in a latency reduction mode operation of a base station and a terminal to enable an efficient use of resources According to an embodiment, a method by a terminal in a mobile communication system is provided. The method includes receiving configuration information corresponding to a transmission mode; receiving first downlink control information on a first subframe; omitting acquiring second downlink control information using a second scheme, if the first downlink control information is acquired based on the first scheme; and transmitting information corresponding to the first downlink control information on a subframe corresponding to the first downlink control information.

In accordance with another embodiment, a method by a base station in a mobile communication system is provided. The method includes transmitting, to a terminal, configuration information corresponding to a transmission mode; transmitting, to the terminal, first downlink control information on a first subframe; and receiving, from the terminal, information corresponding to the first downlink control information on a subframe corresponding to the first downlink control information, wherein acquiring second downlink control information using a second scheme is omitted, if the first downlink control information is acquired based on the first scheme.

In accordance with another embodiment, a terminal in a mobile communication system is provided. The terminal includes a transceiver; and at least one processor coupled with the transceiver and configured to receive configuration information corresponding to a transmission mode, receive first downlink control information on a first subframe, omit acquiring second downlink control information using a second scheme, if the first downlink control information is acquired based on the first scheme, and transmit information corresponding to the first downlink control information on a subframe corresponding to the first downlink control information.

In accordance with another embodiment, a base station in a mobile communication system is provided. The base station includes a transceiver; and at least one processor coupled with the transceiver and configured to transmit, to a terminal, configuration information corresponding to a transmission mode, and receive, from the terminal, information corresponding to the first downlink control information on a subframe corresponding to the first downlink control information, wherein acquiring second downlink control information using a second scheme is omitted, if the first downlink control information is acquired based on the first scheme.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Figure 1:
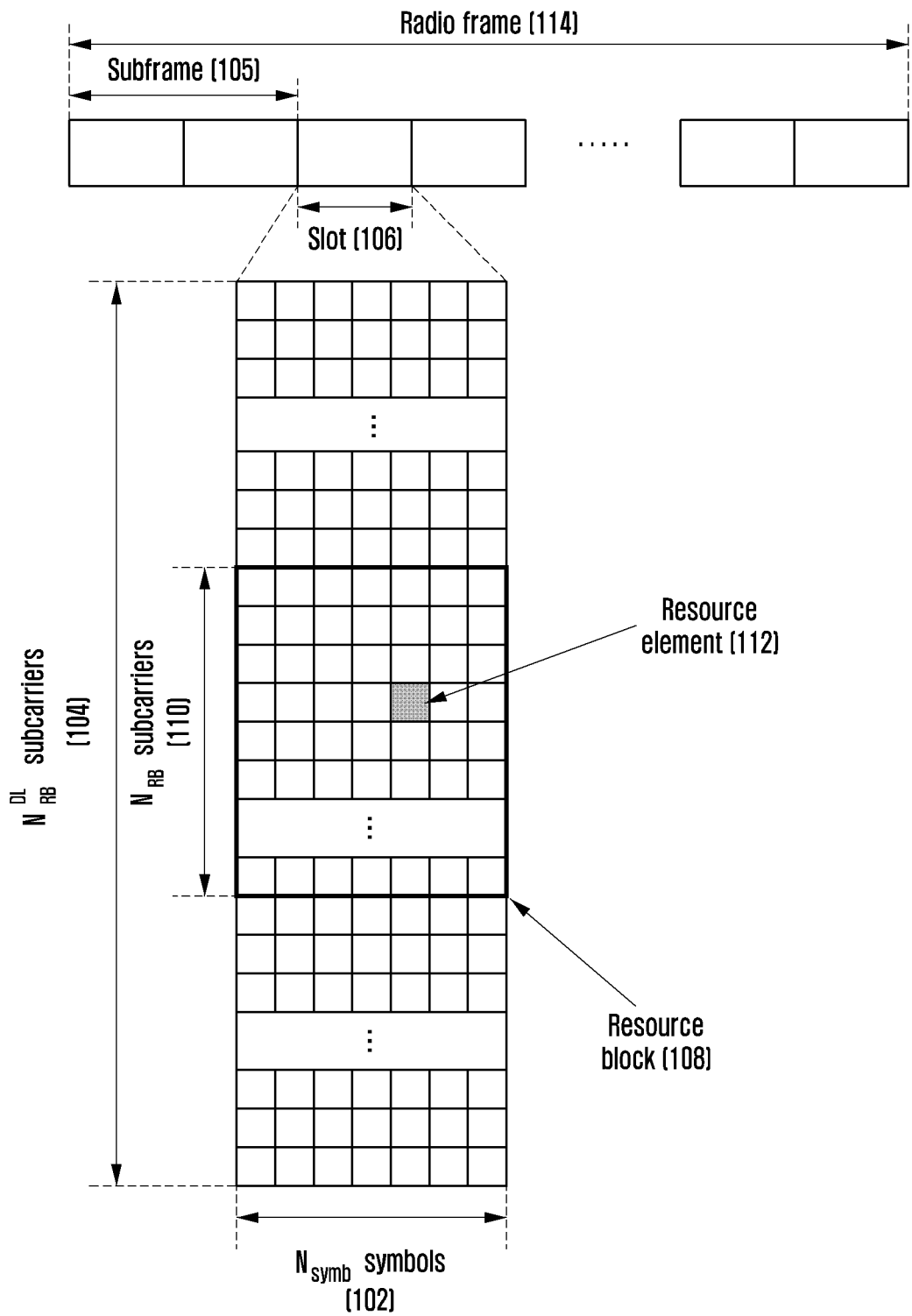
FIG. 1 is a diagram illustrating a downlink time-frequency domain transmission structure of an LTE or LTE-Advanced (LTE-A) system, according to an embodiment.

Embodiments of the present disclosure are described with reference to the accompanying drawings.

In the following description of embodiments, descriptions of well-known techniques that are not directly related to the present disclosure are omitted. This is to clearly convey the subject matter of the present disclosure by omitting an unnecessary explanation.

For the same reason, some elements in the drawings are exaggerated, omitted, or illustrated schematically. Also, the size of each element may not reflect the actual size. In the drawings, the same or similar elements are denoted by the same reference numerals.

In addition, terms used herein are defined in consideration of functions of this disclosure and may be varied depending on a user or an operator's intention or custom. Therefore, the definition should be made based on the contents throughout this description.

The present disclosure may be embodied in many different forms and should not be construed as limited to embodiments set forth herein. Rather, these embodiments are provided so that this disclosure will be thorough and complete, and will fully convey the scope of the disclosure to those skilled in the art.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks.

These computer program instructions may also be stored in a computer or computer-readable memory that may direct a computer or other programmable data processing apparatus to function in a particular manner, such that the instructions stored in the computer or computer-readable memory produce an article of manufacture including an instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which comprises one or more executable instructions for implementing specified logical function(s). In some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or an application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card.

Wireless communication systems that have provided an initial voice-oriented service are evolving into wideband wireless communication systems that provide a high-speed, high-quality packet data service, based on communication standards such as third generation partnership project's (3GPP) high speed packet access (HSPA), LTE (or evolved universal terrestrial radio access (E-UTRA)), LTE-A, 3GPP2's high rate packet data (HRPD), ultra mobile broadband (UMB), and IEEE 802.16e. Further, a 5G or new radio (NR) communication standard is being made for the 5G wireless communication system.

In wireless communication systems including the 5G wireless communication system, at least one service of eMBB, mMTC, and URLLC may be provided to a terminal. Such services may be provided to the same terminal in the same time interval. The eMBB may be a service aiming at a high-speed transmission of high-capacity data, the mMTC may be a service aiming at the minimization of terminal power and the access of multiple terminals, and the URLLC may be a service aiming at high reliability and low latency. The above three services may be a major scenario in the LTE system, the post-LTE system, or a system such as 5G or NR. In the following embodiments, a method for coexistence of eMBB and URLLC, a method for coexistence of mMTC and URLLC, and an apparatus using the same will be described.

When a base station schedules data corresponding to the eMBB service to a certain terminal in a specific transmission time interval (TTI), and when having to transmit URLLC data in the TTI, the base station may transmit the generated URLLC data rather than a part of the eMBB data in a frequency band where the scheduled eMBB data has already been transmitted. An eMBB-scheduled terminal and a URLLC-scheduled terminal may be the same terminal or different terminals. In this case, there is a possibility that the eMBB data is damaged because a part of the already scheduled eMBB data is not transmitted. Therefore, it is necessary to determine a method for receiving and processing a signal in the eMBB-scheduled terminal or the URLLC-scheduled terminal.

In the following embodiments, when information according to eMBB and URLLC is scheduled with a partial or entire frequency band shared, when information according to mMTC and URLLC is simultaneously scheduled, when information according to mMTC and eMBB is simultaneously scheduled, or when information according to eMBB, URLLC, and mMTC is simultaneously scheduled, a method for coexistence of different services will be described to allow transmission of information according to respective services.

In the present disclosure, a base station may refer to at least one of eNode B (eNB), Node B, a radio access unit, a base station controller, or a node on a network. A terminal may include user equipment (UE), a mobile station (MS), a cellular phone, a smart phone, a computer, or a multimedia system capable of performing a communication function. A downlink (DL) refers to a radio transmission path of a signal from a base station to a terminal, and an uplink (UL) refers to a radio transmission path of a signal from a terminal to a base station. Although the following embodiments will be described focusing on an LTE or LTE-A system, the same may be applied to any other communication system having a similar technical background or channel form. For example, various embodiments may be applied to 5G (or NR) mobile communication technologies being developed after LTE-A. In addition, the following embodiments may be applied to other communication systems through some modifications within the scope of the present disclosure as being apparent to a person skilled in the art.

The LTE system is an example of a broadband wireless communication system, and an orthogonal frequency division multiplexing (OFDM) scheme is used in the downlink (DL), and a single carrier frequency division multiplexing (SC-FDMA) scheme is used in the uplink (UL). The uplink refers to a radio link through which a terminal transmits data or a control signal to a base station, and the downlink refers to a radio link through which a base station transmits data or a control signal to a terminal. In a multiple access scheme, time-frequency resources for carrying data or control information to respective individual users are allocated so as not to be overlapped with each other, that is, to realize orthogonality, so that data or control information of each user can be distinguished.

The LTE system adopts a hybrid automatic repeat request (HARQ) scheme in which, when a decoding failure occurs in the initial transmission, the physical layer retransmits the corresponding data. In the HARQ scheme, a receiver that fails to correctly decode data transmits a negative acknowledgment (NACK) indicating a decoding failure to a transmitter so that the transmitter can retransmit the corresponding data in the physical layer. The receiver combines the data retransmitted by the transmitter with the previous failed decoding data to improve data reception performance. On the other hand, the receiver that correctly decodes data transmits an acknowledgment (ACK) indicating a successful decoding to the transmitter so that the transmitter can transmit new data.

In the conventional LTE wireless communication system, the HARQ ACK or NACK information indicating a successful or failed data transmission is transmitted to a base station in the uplink after 3 ms from reception of downlink data. For example, the HARQ ACK/NACK information of a physical downlink shared channel (PDSCH) received from a base station in a subframe n by a terminal is transmitted to the base station through a physical uplink control channel (PUCCH) or a physical uplink shared channel (PUSCH) in a subframe n+4. Also, in the frequency division duplex (FDD) LTE system, a base station may transmit downlink control information (DCI) including uplink resource allocation information to a terminal, or request retransmission through a physical hybrid ARQ indicator channel (PHICH). When such uplink data transmission scheduling is received in the subframe n, the terminal performs uplink data transmission in the subframe n+4. That is, the terminal performs PUSCH transmission in the subframe n+4. The above description is for the LTE system using FDD. In the LTE system using time division duplex (TDD), the HARQ ACK/NACK transmission timing or the PUSCH transmission timing is varied according to the UL-DL subframe configuration. This is performed based on a predetermined rule.

In the LTE system using FDD or TDD, the HARQ ACK/NACK transmission timing or the PUSCH transmission timing is predetermined in accordance with a case where a time required for signal processing of a base station and a terminal is about 3 ms. However, if the LTE base station and terminal decrease the signal processing time to 1 ms or 2 ms, a latency time for data transmission will be reduced.

When a terminal that supports transmission for reducing a latency time is configured in a latency reduction mode, the HARQ-ACK timing for downlink data or the timing of uplink data transmission for uplink data grant may be varied depending on a search space from which the DCI is detected. For example, when the DCI is detected from a common search space, the terminal operates in the timing n+4, and when the DCI is detected from a UE-specific search space, the terminal operates in the n+3 timing. In addition, depending on embodiments, the HARQ-ACK timing may be set through an explicit indicator. If a terminal configured in the latency reduction mode operates in the n+4 timing under scheduling in the common search space in any one subframe and operates in the n+3 timing under scheduling in the UE-specific search space in the next subframe, the HARQ-ACK transmission or PUSCH transmission for scheduling may be performed in the same subframe, and this may cause conflict in uplink transmission. Therefore, in order to prevent such a conflict, a base station may transmit scheduling to a specific latency reduction mode configured terminal in the common search space in any one subframe to operate in the n+4 timing, and may not transmit scheduling operating in the n+3 timing in the next subframe. When a base station and a terminal operate as described above, a method and apparatus for more efficient signal transmission/reception are required. Now, a method and apparatus for detecting a downlink control signal of a terminal for reducing power consumption when performing communication will be described.

FIG. 1 is a diagram illustrating a basic structure of a time-frequency domain that is a radio resource area in which data or a control channel is transmitted in a downlink channel in an LTE system or a similar system, according to an embodiment.

Referring to FIG. 1, the horizontal axis represents a time domain, and the vertical axis represents a frequency domain. The minimum transmission unit in the time domain is an OFDM symbol. $N_{symb}$ OFDM symbols 102 constitute one slot 106, and two slots constitute one subframe 105. The length of the slot is 0.5 ms, and the length of the subframe is 1.0 ms. A radio frame 114 is a time domain interval formed of 10 subframes. The minimum transmission unit in the frequency domain is a subcarrier, and the bandwidth of the entire system transmission bandwidth is composed of a total of $N_{BW}$ subcarriers 104. However, such specific values may be applied variably.

In the time-frequency domain, a basic unit of a resource is a resource element (RE) 112 and may be represented by an OFDM symbol index and a subcarrier index. A resource block (RB) 108 or a physical resource block (PRB) may be defined as $N_{symb}$ consecutive OFDM symbols 102 in the time domain and $N_{RB}$ consecutive subcarriers 110 in the frequency domain. Thus, one RB 108 in one slot may include $N_{symb} \times N_{RB}$ REs 112. In general, the frequency-domain minimum allocation unit of data is the RB. In the LTE system, $N_{symb}$ is 7 and $N_{RB}$ is 12 in general. $N_{BW}$ and $N_{RB}$ may be proportional to the bandwidth of a system transmission band. A data rate increases in proportion to the number of RBs scheduled to a terminal. The LTE system may define and operate six transmission bandwidths. In the case of the FDD system in which downlink and uplink are distinctively operated by means of frequency, a downlink transmission bandwidth and an uplink transmission bandwidth may be different from each other. A channel bandwidth represents an RF bandwidth corresponding to a system transmission bandwidth. Table 1 below shows the relationship between the system transmission bandwidth and the channel bandwidth defined in the LTE system. For example, the LTE system having a 10 MHz channel bandwidth may have a transmission bandwidth of 50 RBs.

TABLE 1

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

The downlink control information may be transmitted within the initial N OFDM symbols in the subframe. N is 1, 2, or 3 normally. Therefore, the N value may be variably applied to each subframe, depending on the amount of control information to be transmitted in the current subframe. The control information may include a control channel transmission interval indicator indicating how many OFDM symbols are used for transmission of control information, scheduling information for downlink data or uplink data, and information about HARQ ACK/NACK.

In the LTE system, the scheduling information for downlink data or uplink data is transmitted from a base station to a terminal through downlink control information (DCI). The DCI is defined using various formats, and may indicate, based on each format, whether it is scheduling information (UL grant) for uplink data or scheduling information (DL grant) for downlink data, whether it is a compact DCI having a small size of control information, whether to apply spatial multiplexing using multiple antennas, and whether it is a power control DCI. For example, DCI format 1, which is scheduling control information (DL grant) for downlink data, may include at least one of the following types of control information.

The first type of control information is a resource allocation type 0/1 flag that indicates whether the resource allocation type is type 0 or type 1. The type 0 allocates resources in the unit of a resource block group (RBG) by applying a bitmap scheme. In the LTE system, a basic unit of scheduling is an RB represented by time/frequency domain resources, and an RBG composed of a plurality of RBs becomes a basic unit of scheduling in the type 0 scheme. The type 1 scheme allocates a specific RB in the RBG.

The next type of control information is a resource block assignment that indicates an RB allocated to data transmission. The resources to be represented are determined according to a system bandwidth and a resource allocation scheme.

The next type of control information is a modulation and coding scheme (MCS) that indicates a modulation scheme used for data transmission and the size of a transport block to be transmitted.

The next type of control information is a HARQ process number that indicates a HARQ process number.

The next type of control information is a new data indicator that indicates HARQ initial transmission or retransmission.

The next type of control information is a redundancy version that indicates a redundancy version of HARQ.

Finally, a transmit power control (TPC) command for physical uplink control channel (PUCCH) is a control command that indicates a transmit power control command for PUCCH which is an uplink control channel.

The DCI that passes through a channel coding and modulation process may be transmitted on a physical downlink control channel (PDCCH) (or referred to as control information) or an enhanced PDCCH (EPDCCH) (or referred to as enhanced control information).

In general, the DCI is scrambled with a specific radio network temporary identifier (RNTI) (or a terminal identifier) independently for each terminal, is added to a cyclic redundancy check (CRC), is channel-coded, and then transmitted on each independent PDCCH. In the time domain, the PDCCH is mapped and transmitted in the control channel transmission interval. A frequency domain mapping position of the PDCCH is determined by an identifier (ID) of each terminal, and may be transmitted over the entire system transmission band.

Downlink data may be transmitted on a physical downlink shared channel (PDSCH) which is a physical channel for downlink data transmission. The PDSCH may be transmitted after the control channel transmission interval, and scheduling information such as a specific mapping position and a modulation scheme in the frequency domain is determined based on the DCI transmitted through the PDCCH.

Through the MCS among the control information configuring the DCI, a base station notifies, to a terminal, a modulation scheme applied to the PDSCH to be transmitted to the terminal and a transport block size (TBS) to be transmitted. In an embodiment, the MCS may be composed of 5 bits or more or less. The TBS corresponds to a size before channel coding for error correction is applied to a transport block (TB) to be transmitted by a base station.

The modulation schemes supported by the LTE system are quadrature phase shift keying (QPSK), 16 quadrature amplitude modulation (QAM), and 64QAM, each modulation order (Qm) of which corresponds to 2, 4, or 6. That is, 2 bits per symbol may be transmitted in the case of QPSK modulation, 4 bits per symbol may be transmitted in the case of 16QAM modulation, and 6 bits per symbol may be transmitted in the case of 64QAM modulation. In addition, 256QAM or more modulation schemes may be used according to a system modification.

Figure 2:
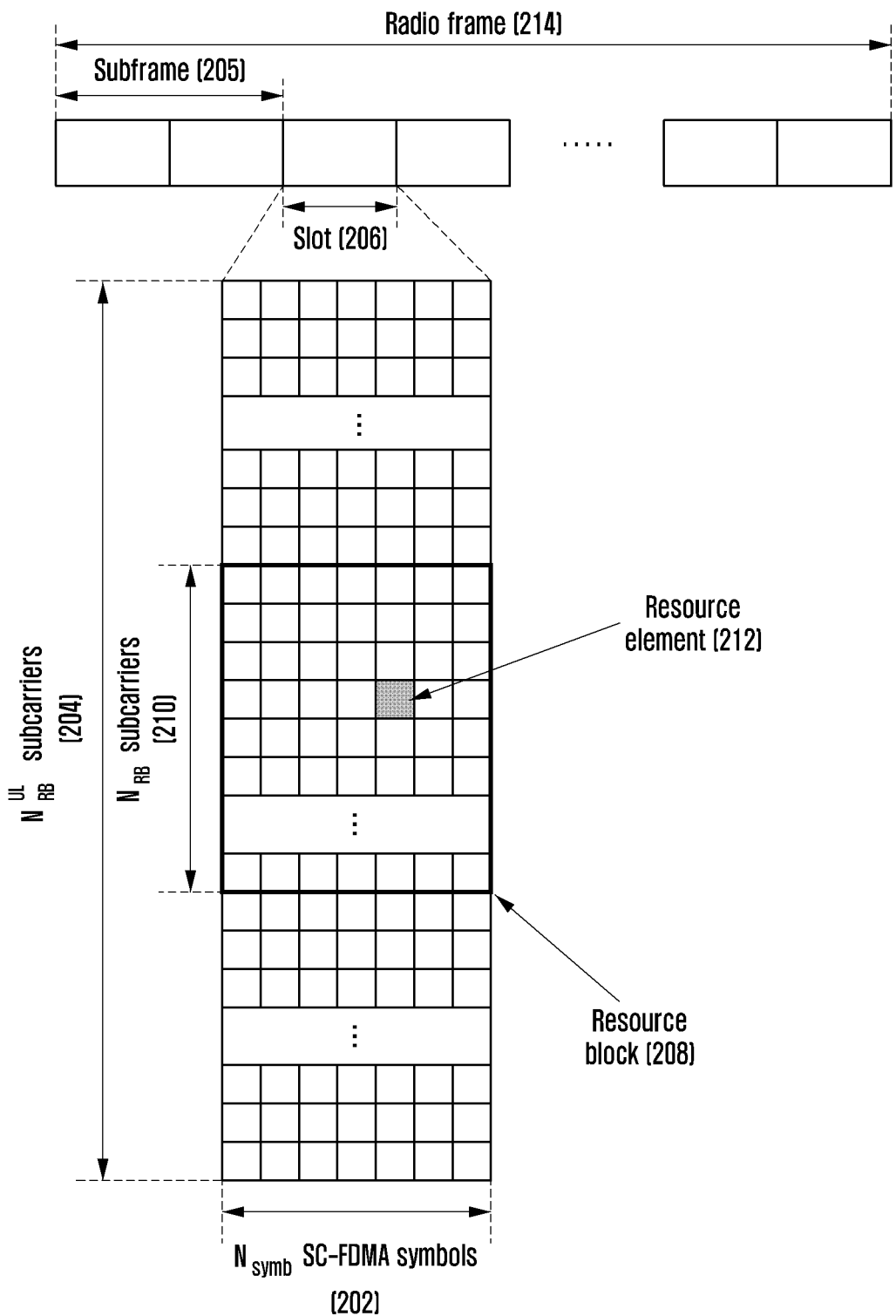
FIG. 2 is a diagram illustrating an uplink time-frequency domain transmission structure of an LTE or LTE-A system, according to an embodiment.

FIG. 2 is a diagram illustrating a basic structure of a time-frequency domain that is a radio resource area in which data or a control channel is transmitted in an uplink channel in an LTE-A system.

Referring to FIG. 2, the horizontal axis represents a time domain, and the vertical axis represents a frequency domain. The minimum transmission unit in the time domain is an SC-FDMA symbol 202. $N_{symb}^{UL}$ SC-FDMA symbols constitute one slot 206, and two slots form one subframe 205. The minimum transmission unit in the frequency domain is a subcarrier, and the entire system transmission bandwidth 204 is composed of a total of $N_{BW}$ subcarriers. The $N_{BW}$ may have a value proportional to the system transmission bandwidth.

In the time-frequency domain, a basic unit of a resource is a resource element (RE) 212 and may be defined by an SC-FDMA symbol index and a subcarrier index. A resource block pair (RB pair) 208 may be defined as $N_{symb}^{UL}$ consecutive SC-FDMA symbols in the time domain and $N_{sc}^{RB}$ consecutive subcarriers in the frequency domain. Thus, one RB consists of $N_{symb}^{UL} \times N_{sc}^{RB}$ REs. In general, the minimum transmission unit of data or control information is an RB unit. PUCCH is mapped to the frequency domain corresponding to 1 RB and transmitted in one subframe.

In the LTE system, a timing relationship of PUCCH or PUSCH may be defined. PUCCH or PUSCH is an uplink physical channel in which HARQ ACK/NACK corresponding to PDCCH/EPDDCH including semi-persistent scheduling release (SPS release) or PDSCH which is a physical channel for downlink data transmission may be defined. For example, in the LTE system that operates with FDD, the HARQ ACK/NACK corresponding to PDCCH/EPDCCH including SPS release or PDSCH transmitted in the (n−4)th subframe may be transmitted via PUCCH or PUSCH in the nth subframe.

In the LTE system, the downlink HARQ employs an asynchronous HARQ scheme in which data retransmission timing is not fixed. That is, when HARQ NACK is fed back from a terminal for the initial transmission data transmitted from a base station, the base station freely determines the transmission timing of retransmission data by a scheduling operation. The terminal may perform buffering on data determined as error data after decoding of received data for HARQ operation, and then perform combining with the next retransmission data.

The HARQ ACKNACK information of the PDSCH transmitted in the (n-k)th subframe is transmitted to a base station by a terminal through the PUCCH or PUSCH in the subframe n, and where k may be defined differently depending on FDD or TDD of the LTE system and subframe configuration thereof. For example, in the case of the FDD LTE system, k is fixed to 4. On the other hand, in the case of the TDD LTE system, k may be changed according to the subframe configuration and the subframe number. Also, for the data transmission through a plurality of carriers, the value of k may be applied differently according to the TDD configuration of each carrier. In the case of TDD, k is determined according to the TDD UL/DL configuration as shown in Table 2 below.

TABLE 2

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Unlike the downlink HARQ in the LTE system, the uplink HARQ adopts a synchronous HARQ scheme in which the data transmission timing is fixed. That is, an uplink/downlink timing relationship among a PUSCH which is a physical channel for uplink data transmission, a preceding PDCCH, and a PHICH in which downlink HARQ ACK/NACK corresponding to the PUSCH is transmitted may be transmitted and received according to the following rule.

According to the rule, when a terminal receives, in subframe n, the PDCCH including uplink scheduling control information transmitted from a base station or the PHICH in which the downlink HARQ ACK/NACK is transmitted, the terminal transmits uplink data corresponding to the control information through the PUSCH in the subframe n+k. Here, k may be defined differently depending on the FDD or TDD of the LTE system and configuration thereof. For example, in the case of the FDD LTE system, k may be fixed to 4. On the other hand, in the case of the TDD LTE system, k may be changed according to the subframe configuration and the subframe number. Also, for data transmission through a plurality of carriers, the value of k may be applied differently according to the TDD configuration of each carrier. In the case of TDD, k is determined according to the TDD UL/DL configuration as shown in Table 3 below.

TABLE 3

| TDD UL/DL Configuration | 0 | 1 | 2 | 3 | 4 | 5 | 6 | 7 | 8 | 9 |
|---|---|---|---|---|---|---|---|---|---|---|
| 0 | 4 | 6 |   |   |   | 4 | 6 |   |   |   |
| 1 |   | 6 |   |   | 4 |   | 6 |   |   | 4 |
| 2 |   |   |   | 4 |   |   |   |   | 4 |   |
| 3 | 4 |   |   |   |   |   |   |   | 4 | 4 |
| 4 |   |   |   |   |   |   |   |   | 4 | 4 |
| 5 |   |   |   |   |   |   |   |   | 4 |   |
| 6 | 7 | 7 |   |   |   | 7 | 7 |   |   | 5 |

Meanwhile, the HARQ-ACK information of the PHICH transmitted in any subframe is associated with the PUSCH transmitted in subframe i-k. In the case of the FDD system, k is 4. That is, in the FDD system, the HARQ-ACK information of the PHICH transmitted in subframe i is associated with the PUSCH transmitted in subframe i-4. In the case of the TDD system, when a terminal with no configured enhanced interference mitigation and traffic adaptation (eIMTA) is configured with only one serving cell or has the same TDD UL/DL configuration, and when the TDD UL/DL configuration is 1 to 6, k may be provided as shown in Table 4 below.

TABLE 4

| TDD UL/DL Configuration | 0 | 1 | 2 | 3 | 4 | 5 | 6 | 7 | 8 | 9 |
|---|---|---|---|---|---|---|---|---|---|---|
| 0 | 7 | 4 |   |   |   | 7 | 4 |   |   |   |
| 1 |   | 4 |   |   | 6 |   | 4 |   |   | 6 |
| 2 |   |   |   | 6 |   |   |   |   | 6 |   |
| 3 | 6 |   |   |   |   |   |   |   | 6 | 6 |
| 4 |   |   |   |   |   |   |   |   | 6 | 6 |
| 5 |   |   |   |   |   |   |   |   | 6 |   |
| 6 | 6 | 4 |   |   |   | 7 | 4 |   |   | 6 |

That is, in TDD UL/DL configuration 1, the PHICH transmitted in subframe 6 may be the HARQ-ACK information of the PUSCH transmitted in subframe 2 which is four subframes before.

In the case of the TDD UL/DL configuration 0, if the HARQ-ACK is received in the PHICH resource corresponding to $I_{PHICH}=0$, the PUSCH indicated by the HARQ-ACK information is transmitted in subframe i-k, and the k value is given as shown in Table 4, above. In the case of the TDD UL/DL configuration 0, if the HARQ-ACK is received in the PHICH resource corresponding to $I_{PHICH}=1$, the PUSCH indicated by the HARQ-ACK information is transmitted in subframe i-6.

Although the above description of the wireless communication system is based on the LTE system, the present disclosure is not limited to the LTE system and may be applied to various wireless communication systems such as NR and 5G. Also, in the case where the present disclosure is applied to another wireless communication system, the k value may be applied through modification to a system using a modulation scheme corresponding to FDD.

Figure 3:
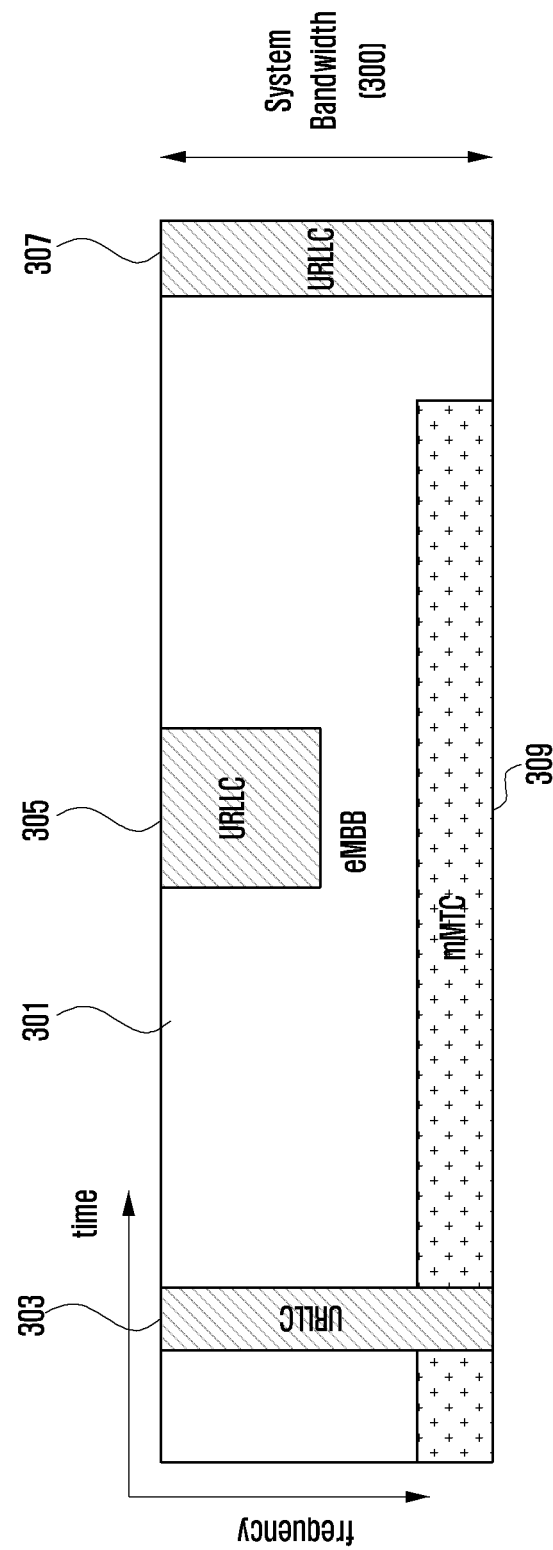
FIGS. 3 and 4 are diagrams illustrating data for enhanced mobile broadband (eMBB), ultra reliable low latency communications (URLLC), and massive machine type communications (mMTC) allocated to frequency-time resources in a communication system, according to an embodiment.
Figure 4:
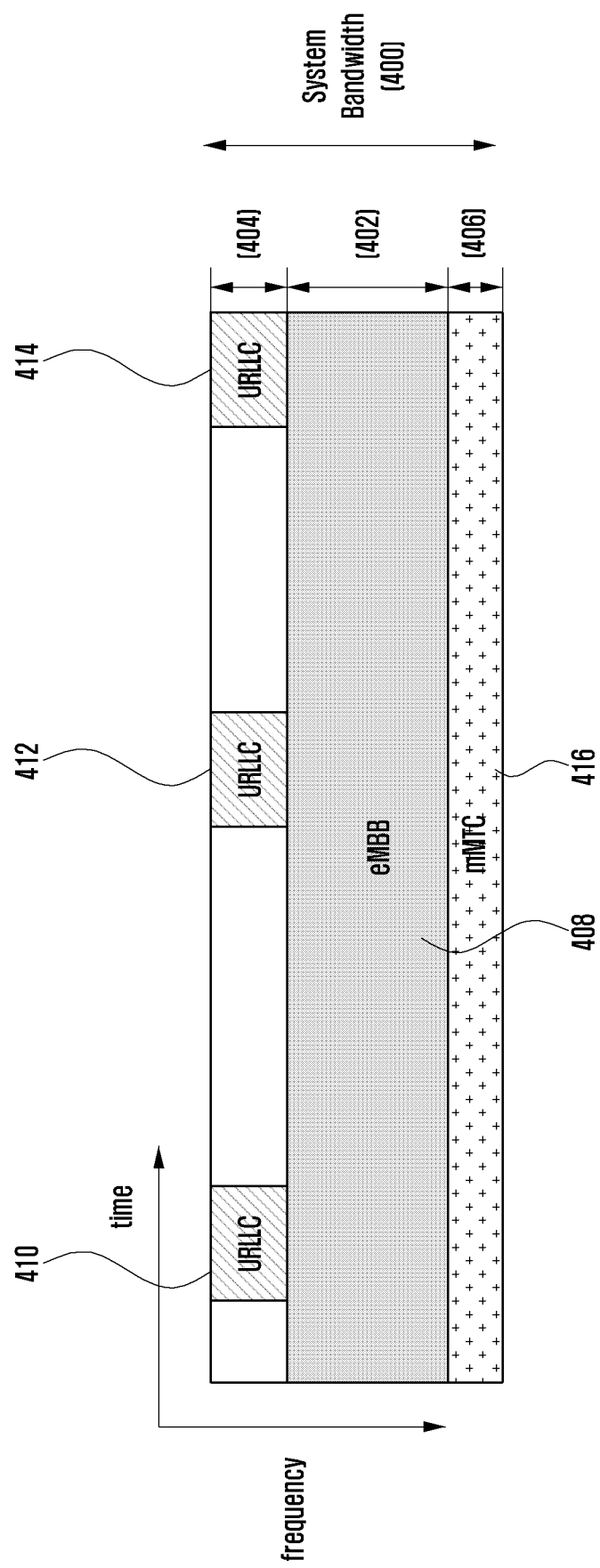

FIGS. 3 and 4 are diagrams illustrating an allocation scheme of data for eMBB, URLLC, and mMTC, which are services considered in the 5G or NR system, in frequency-time resources.

Referring to FIGS. 3 and 4, shown are a scheme of allocating frequency and time resources for information transmission in each system.

First, FIG. 3 shows the allocation of data for eMBB, URLLC, and mMTC in the entire system frequency band 300. When URLLC data 303, 305, and 307 are generated and need to be transmitted while eMBB 301 and mMTC 309 are transmitted in a specific allocated frequency band, the URLLC data 303, 305, and 307 may be transmitted by emptying portions to which the eMBB 301 and the mMTC 309 have already been allocated, or by not transmitting the eMBB 301 and the mMTC 309. Among these services, the URLLC needs to reduce a latency time, so that the URLLC data 303, 305, and 307 to be transmitted may be allocated to a portion of the eMBB-allocated resource 301. Of course, when the URLLC is further allocated to the resource to which the eMBB has already been allocated, the eMBB data may not be transmitted in this overlapped frequency-time resource, and thus the transmission performance of the eMBB data may be lowered. That is, in this case, the transmission of the eMBB data may fail because of the URLLC allocation.

In FIG. 4, the entire system frequency band 400 may be divided into sub-bands 402, 404, and 406 which are used to transmit services and data. Information associated with sub-band configuration may be predetermined and transmitted to a terminal by a base station through upper layer signaling. Alternatively, the sub-bands may be arbitrarily divided by a base station or a network node, and services may be provided to a terminal without separate transmission of the sub-band configuration information. In FIG. 4, a sub-band 402 is used for eMBB data transmission, a sub-band 404 is used for URLLC data transmission, and a sub-band 406 is used for mMTC data transmission.

The length of a transmission time interval (TTI) used in the URLLC transmission may be shorter than the TTI length used in the eMBB or mMTC transmission. Also, a response to information associated with the URLLC may be transmitted faster than that of the eMBB or the mMTC, thus allowing information transmission/reception with a low latency.

Figure 5:
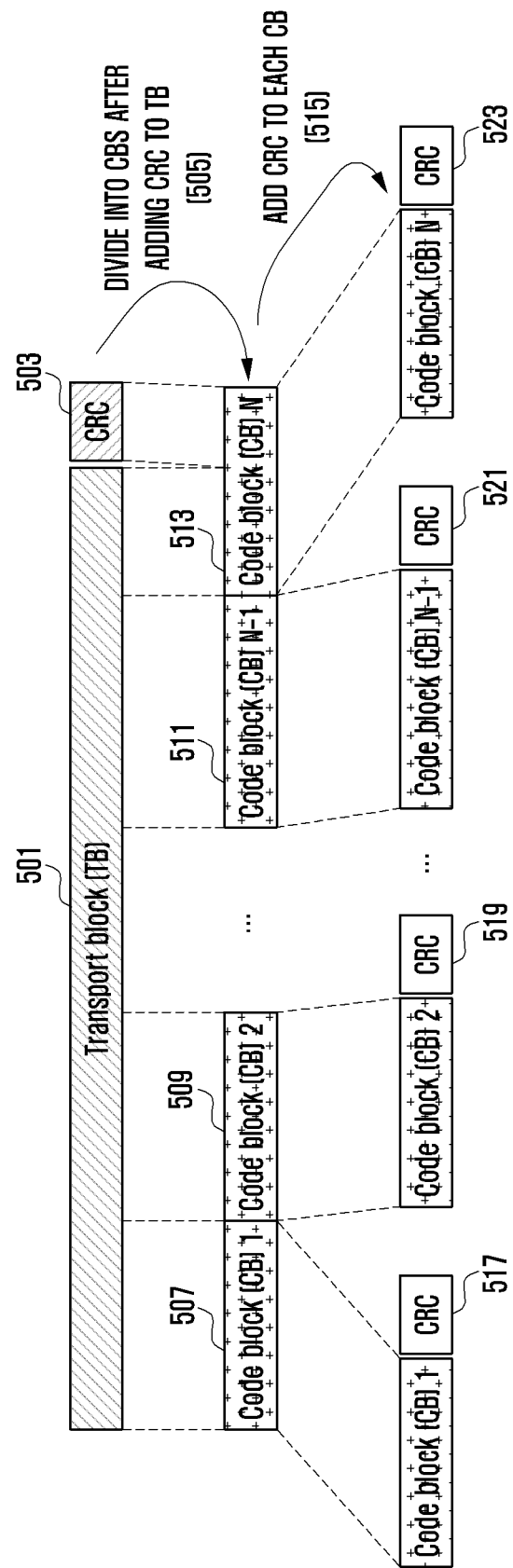
FIG. 5 is a diagram illustrating a structure in which one transport block is divided into several code blocks and a cyclic redundancy check (CRC) is added, according to an embodiment.

FIG. 5 is a diagram illustrating a process in which one transport block is divided into a plurality of code blocks and a CRC is added.

Referring to FIG. 5, a CRC 503 may be added to the last or first part of one transport block (TB) 501 to be transmitted in an uplink or downlink transmission. The CRC may have 16 bits, 24 bits, a previously fixed number of bits, or a variable number of bits depending on a channel condition, and may be used to determine whether channel coding is successful. A block composed of the TB 510 and the CRC 503 may be divided into a plurality of code blocks (CBs) 507, 509, 511, and 513 as indicated by a reference numeral 505. The CBs may have the predetermined maximum size. In this case, the last CB 513 may be smaller than the other CBs, or may have the same length as those of the other CBs by inserting 0, 1, or any other random value. As indicated by reference numeral 515, CRCs 517, 519, 521, and 523 may be added to the divided CBs, respectively. This CRC may have 16 bits, 24 bits, or a previously fixed number of bits, and may be used to determine whether channel coding is successful. However, the CRC 503 added to the TB and the CRCs 517, 519, 521, and 523 added to the CBs may be omitted depending on the type of a channel code to be applied to the CB. For example, if a low density parity check (LDPC) code, rather than a turbo code, is applied to the CB, the CRCs 517, 519, 521, and 523 to be inserted into the respective CBs may be omitted. On the other hand, even when the LDPC is applied, the CRCs 517, 519, 521, and 523 may be added to the CBs. Also, even in the case where a polar code is used, the CRC may be added or omitted.

Hereinafter, the eMBB service will be referred to as a first type service, and the data for eMBB will be referred to as first type data. The first type service or the first type data is not limited to the eMBB, and may be applicable to other cases where high-speed data transmission is required or broadband transmission is performed. In addition, the URLLC service will be referred to as a second type service, and the URLLC data will be referred to as second type data. The second type service or the second type data is not limited to the URLLC, and may be applicable to other cases where a low latency time is required or high reliability transmission is needed or to other systems that requires a low latency time and high reliability transmission at the same time. In addition, the mMTC service will be referred to as a third type service, and the mMTC data will be referred to as third type data. The third type service or the third type data is not limited to the mMTC, and may be applied to other cases where a low speed, wide coverage, or low power is required. Also, it may be understood that the first type service may include the third type service.

The structure of a physical layer channel used for each type to transmit the above three services or data may be different. For example, at least one of a TTI length, a frequency resource allocation unit, a control channel structure, and a data mapping method may be different.

Although three types of services and three types of data are described above, more types of services and corresponding data may exist. Even in this case, the above description of the present disclosure may be applied.

In order to describe a method and apparatus as provided in the embodiments, the terms "physical channel" and "signal" in a conventional LTE or LTE-A system may be used. However, the present disclosure may be applied to wireless communication systems other than the LTE and LTE-A systems.

As described above, operations of a terminal and a base station for transmitting and receiving first type, second type, and third type services or data are defined, and a method for operating, in the same system, terminals that receive scheduling of different type services or data is provided. In the present disclosure, the first type, the second type, and the third type terminals refer to terminals that receive scheduling of first type, second type, and third type services or data, respectively. In embodiments, the first type terminal, the second type terminal, and the third type terminal may be the same terminal or different terminals.

In the following embodiments, at least one of a PHICH and uplink scheduling grant signal and a downlink data signal is referred to as a first signal. In addition, at least one of an uplink data signal for the uplink scheduling grant signal and a HARQ ACK/NACK signal for the downlink data signal is referred to as a second signal. Among signals transmitted from a base station to a terminal, a signal expecting a response from the terminal may be the first signal. Also, a terminal response signal corresponding to the first signal may be the second signal. The service type of the first signal may be at least one of eMBB, URLLC, and mMTC, and the second signal may also correspond to at least one such service. For example, in the LTE and LTE-A systems, the PUCCH format 0 or 4 and the PHICH may be the first signal, and the PUSCH may be the corresponding second signal. Also, for example, in the LTE and LTE-A systems, the PDSCH may be the first signal, and the PUCCH or PUSCH including the HARQ ACK/NACK information of the PDSCH may be the second signal. Also, the PDCCH/EPDCCH including an aperiodic channel measurement request (i.e., an aperiodic channel state information (CSI) trigger) may be the first signal, and the PUSCH including channel measurement information may be the corresponding second signal.

Further, in the following embodiments, if it is assumed that a terminal transmits the second signal in the (n+k)th TTI when a base station transmits the first signal in the nth TTI, the base station informing the terminal of the timing to transmit the second signal is the same as notifying a k value. Alternatively, if it is assumed that a terminal transmits the second signal in the (n+4+a)th TTI when a base station transmits the first signal in the nth TTI, the base station informing the terminal of the timing to transmit the second signal is the same as notifying an offset value "a". Instead of n+4+a, the offset may be defined in various manners such as n+3+a and n+5+a. Similarly, the offset value "a" in n+4+a to be mentioned hereinafter may be defined in various manners.

Although the present disclosure is described on the basis of the FDD LTE system, the present disclosure is also applicable to the TDD system and the NR system.

In the present disclosure, upper layer signaling is a signal transmission method in which a base station transmits a signal to a terminal via a downlink data channel of a physical layer or in which a terminal transmits a signal to a base station via an uplink data channel of a physical layer. The upper layer signaling may be referred to as radio resource control (RRC) signaling, packet data convergence protocol (PDCP) signaling, or a medium access control (MAC) control element (MAC CE).

Described herein is a method for determining the timing of transmitting the second signal after a terminal or a base station receives the first signal. Transmission of the second signal may be performed using various methods. For example, although the timing of transmitting HARQ ACK/NACK information corresponding to PDSCH to a base station after a terminal receives the PDSCH which is downlink data complies with a method described in this disclosure, selecting a PUCCH format to be used, selecting a PUCCH resource, or mapping the HARQ ACK/NACK information to the PUSCH may comply with the conventional LTE method.

A normal mode refers to a mode using first and second signal transmission timing in the conventional LTE and LTE-A systems. In the normal mode, it is possible to secure a signal processing time of about 3 ms including a timing advance (TA). For example, in the FDD LTE system that operates in the normal mode, a terminal that receives the first signal in subframe n transmits the second signal in response to the first signal in subframe n+4. This transmission may be referred to as an n+4 timing transmission. If the second signal is scheduled to be transmitted in the n+4 timing in response to the first signal transmitted in subframe n+k, it means that the second signal is transmitted in subframe n+k+4. On the other hand, the n+4 timing in TDD may mean that it complies with a prearranged timing relationship on the assumption that the subframe in which the second signal in response to the first signal transmitted in subframe n can be transmitted the fastest is n+4. In the TDD system, since the subframe n+4 may not be for uplink transmission, it may be impossible for a terminal to transmit the second signal in subframe n+4. It is therefore necessary to define the timing relationship for the second signal transmission, and the n+4 timing may be said to define the minimum timing as the subframe n+4 when defining the above relationship. On the contrary, the n+3 timing in TDD may mean that it complies with a prearranged timing relationship on the assumption that the subframe in which the second signal in response to the first signal transmitted in the subframe n can be transmitted the fastest is n+3. Similarly, it is necessary to define the timing relationship for the second signal transmission, and the n+3 timing may be said to define the minimum timing as subframe n+3 when defining the above relationship.

Meanwhile, a latency reduction mode refers to a mode that allows the transmission timing of the second signal in response to the first signal to be faster than or equal to that in the normal mode, thus reducing a latency time. In the latency reduction mode, the timing may be controlled in various manners. The latency reduction mode may be used interchangeably with a reduced processing time mode. The latency reduction mode may be configured through upper layer signaling in a terminal that supports the latency reduction mode. The latency reduction mode configured terminal may transmit, before the subframe n+4, the second signal in response to the first signal transmitted in subframe n. For example, the latency reduction mode configured terminal may transmit, in subframe n+3, the second signal in response to the first signal transmitted in subframe n. This transmission may be referred to as the n+3 timing transmission. If the second signal is scheduled to be transmitted in the n+3 timing transmission in response to the first signal transmitted in subframe n+1, this means that the second signal is transmitted in subframe n+4. Similarly, if the second signal is scheduled to be transmitted in the n+3 timing transmission in response to the first signal transmitted in subframe n+2, this means that the second signal is transmitted in subframe n+5. That is, if the second signal is scheduled to be transmitted in the n+3 timing transmission in response to the first signal transmitted in subframe n+k, this means that the second signal is transmitted in subframe n+k+3.

The present disclosure will be described based on a case where the same length of the TTI is used in the normal mode and the latency reduction mode. However, the present disclosure may also be applied to other cases where the length of the TTI in the normal mode is different from the length of the TTI in the latency reduction mode.

According to an embodiment of the present disclosure, if the first signal is the PDSCH, the second signal may be the PUCCH or PUSCH including the HARQ-ACK information of the PDSCH. If the first signal is the PDCCH or EPDCCH including the uplink scheduling information or PHICH, the second signal may be the PUSCH for the uplink scheduling. Also, if the first signal is the PDCCH/EPDCCH including an aperiodic channel measurement request (i.e., an aperiodic CSI trigger), the second signal may be the PUSCH including channel measurement information.

When the latency reduction mode is configured in a terminal through upper layer signaling, there is an uncertainty when the upper layer signaling is delivered to the terminal. Therefore, a method for always delivering the second signal at a predetermined timing regardless of a base station configuration may be required. For example, even if a base station configures the latency reduction mode for a terminal to perform the n+3 timing transmission, it is not guaranteed that the terminal knows exactly when the latency reduction mode configuration is valid. Therefore, while the configuration is made, the base station may need the n+4 timing transmission of the terminal. That is, a method for the n+4 timing transmission may be required regardless of the latency reduction mode configuration. In the present disclosure, the n+4 timing transmission performed regardless of the latency reduction mode configuration may be used interchangeably with fall-back mode transmission. Therefore, when the fall-back mode transmission is made, the base station performs the uplink reception operation based on the assumption that the second signal is transmitted at the timing n+4 instead of the timing n+3 or n+2.

The fall-back mode transmission may be performed when the first signal transmission is delivered in a specific format of downlink control information (DCI) (Case 1), when the DCI for the first signal transmission is delivered in a particular search space (Case 2), or when the DCI is delivered using a predetermined specific RNTI value (Case 3).

The search space may be a cell-specific search space (CSS) and a UE-specific search space (USS), defined as follows. A control channel element (CCE) number to which a downlink control signal and control channel of an aggregation level L can be mapped in subframe k as follows in Equation (1).

$$L\{(Y_k+m') \bmod \lfloor N_{CCE,k}/L \rfloor\}+i \quad (1)$$

In the case of aggregation levels 4 and 8 in the CSS, $Y_k$ is defined as 0. In the USS, $Y_k$ is defined as $(A \cdot Y_{k-1}) \bmod D$ where $Y_{-1}$ $(=n_{RNTI})$ is not 0, A is 39827, D is 65537, $k=\lfloor n_s/2 \rfloor$, and $n_s$ is a slot number in a radio frame. In the above, x mod y may indicate the remainder of dividing x by y. $M^{(L)}$ denotes the number of downlink control channels in an aggregation level L. m may be a natural number from 0 to $M^{(L)}$, m'=m in the CSS, and m'=m+$M^{(L)} \cdot n_{CI}$ in the USS. $n_{CI}$ may be a carrier indicator field value. The value of $M^{(L)}$ may be defined as shown in Table 5 below.

TABLE 5

| | Search space $S_L^{(L)}$ | | |
|---|---|---|---|
| Type | Aggregation level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

According to Table 5, in the CSS, a CCE number at which a control signal begins to be mapped is determined as 0, 4, 8, and 12 in the aggregation level 4, and as 0 and 8 in the aggregation level 8. The USS may be varied according to an RNTI value serving as the unique number of a terminal.

In the above Case 1 where the fall-back mode transmission is performed when the first signal transmission is delivered in a specific DCI format, the second signal may always be transmitted at the timing n+4 regardless of the latency reduction mode configuration of a base station when downlink scheduling is made with the DCI format 1A in the conventional LTE system. That is, even if a terminal is configured to transmit the second signal at the timing n+3, the terminal transmits the second signal at the timing n+4 when the downlink scheduling is made with the DCI format 1A.

In the above Case 2 where the fall-back mode transmission is performed when the DCI for the first signal transmission is delivered in a specific search space, the second signal may always be transmitted at the timing n+4 regardless of the latency reduction mode configuration of a base station in response to the first signal associated with the DCI when the DCI is delivered in the CSS. That is, even if a terminal is configured to transmit the second signal at the timing n+3, the terminal transmits the second signal at the timing n+4 when the DCI is delivered in the CSS.

In the above Case 3 where the fall-back mode transmission is performed when the DCI is delivered using a predetermined specific RNTI value, the second signal may always be transmitted at the timing n+4 regardless of the latency reduction mode configuration of a base station in response to the first signal associated with the DCI when the RNTI for the fall-back mode transmission is configured in advance in a terminal and when the base station generates the PDCCH or EPDCCH by using the RNTI and delivers the DCI. That is, even if the terminal is configured to transmit the second signal at the timing n+3, the terminal transmits the second signal at the timing n+4 when the PDCCH or EPDCCH decoding succeeds using the RNTI value.

The latency reduction mode may be referred to as a specific mode, and the fall-back mode may be referred to as a sub-mode of the specific mode. In addition, receiving the downlink control information in the fall-back mode of the latency reduction mode may be referred to as receiving the downlink control information according to a first mode, receiving the downlink control information in a non-fall-back mode of the latency reduction mode may be referred to as receiving the downlink control information according to a second mode. Also, in some embodiments, the fall-back mode may be referred to as the second mode, the non-fall-back mode may be referred to as the first mode. By receiving the control information through different methods, the terminal may implicitly acquire information about the corresponding uplink subframe.

Figure 6:
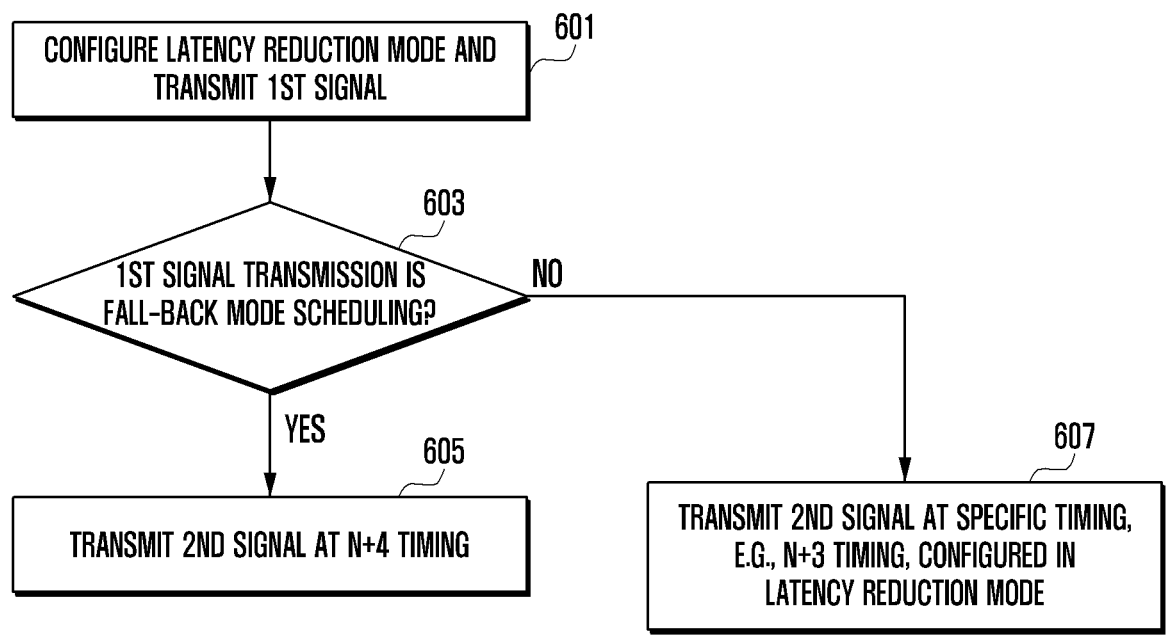
FIG. 6 is a flowchart illustrating a method for uplink transmission by a terminal, according to an embodiment.

FIG. 6 is a flowchart illustrating a method for uplink transmission by a terminal when a base station configures a latency reduction mode to the terminal and transmits a first signal.

As shown in FIG. 6, at step 601, the latency reduction mode may be configured in the terminal when the first signal is received from the base station. Specifically, the latency reduction mode may be configured in the terminal through upper layer signaling, such as RRC signaling. The terminal may receive the RRC signaling including information associated with the configuration of the latency reduction mode from the base station and then, based on the received information, perform subsequent operations.

At step 603, the terminal determines whether the first signal transmission is fall-back mode scheduling. If the first signal transmission is the fall-back mode scheduling, the terminal may transmit the second signal at the n+4 timing regardless of the latency reduction mode configuration at step 605. If the first signal transmission is not the fall-back mode transmission, the terminal may transmit the second signal at a specific timing, such as the n+3 timing or the n+2 timing, determined according to the latency reduction mode configuration at step 607.

A transmission mode in which the fastest transmission timing of the second signal in response to the first signal transmitted in subframe n is subframe n+4 may be referred to as a normal mode. In addition, a transmission mode in which the fastest transmission timing of the second signal in response to the first signal transmitted in subframe n is subframe n+2 or n+3 may be referred to as a latency reduction mode or a reduced processing time mode. Subframe n+4, which is the reference transmission timing for distinguishing the normal mode from the latency reduction mode, may be changed to another timing, which may be applied to embodiments of this disclosure.

The following description will be made on the basis of the operation in the fall-back mode with the n+4 timing when the DCI is detected from a specific search space, as described above in the Case 2. That is, in the above Case 2 where the fall-back mode transmission is performed when the DCI for the first signal transmission is delivered in a specific search space, the second signal may always be transmitted at the timing n+4 regardless of the latency reduction mode configuration of a base station in response to the first signal associated with the DCI when the DCI is delivered in a common search space (CSS). Even if a terminal is configured to transmit the second signal at the timing n+3, the terminal transmits the second signal at the timing n+4 when the DCI is delivered in the CSS. On the contrary, if the DCI is delivered in a UE-specific search space (USS), the terminal transmits the second signal at the timing n+3 as configured.

In the conventional LTE terminal, a DCI format to be detected is varied depending on a transmission mode. For example, when the transmission mode 4 is configured, the terminal for receiving the PDSCH delivered using the C-RNTI may attempt to detect the DCI format 1A in the CSS and the USS and attempt to detect the DCS format 2 in the USS. Therefore, if the latency reduction mode is configured with the n+3 timing in the above example, the fall-back mode with the n+4 timing may be performed when the terminal detects the DCI format 1A in the CSS. The DCI format 1A is related to downlink data transmission scheduling, and the DCI format 0 may be used for fall-back mode transmission in uplink data scheduling.

Figure 7:
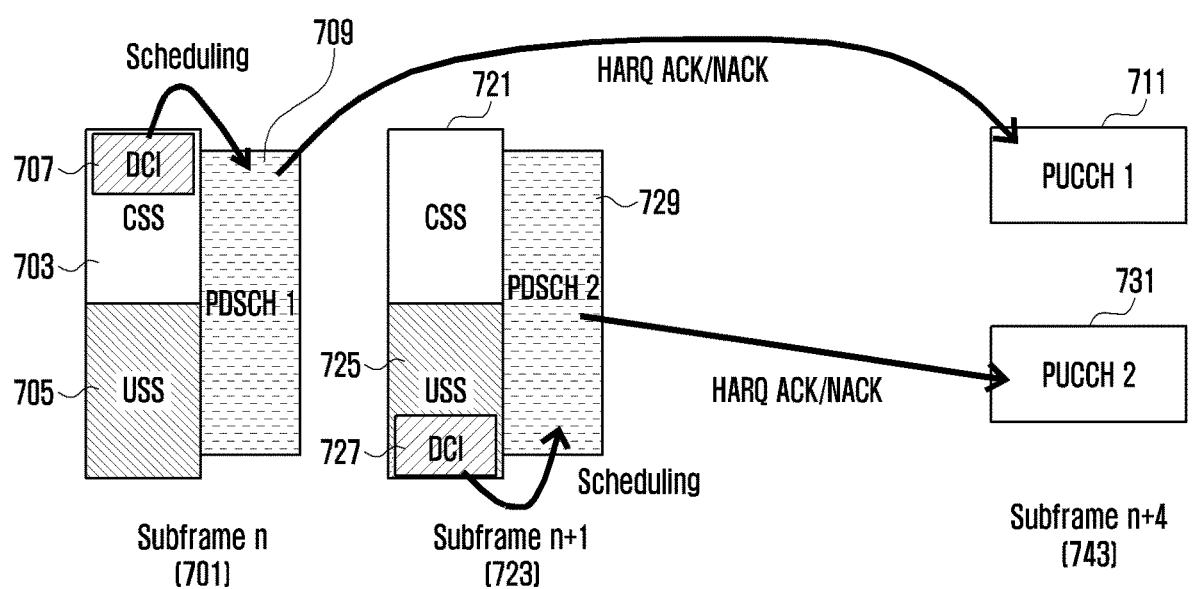
FIG. 7 is a diagram illustrating a second signal transmission timing conflict due to use of a fall-back mode in latency reduction mode configuration, according to an embodiment.

FIG. 7 is a diagram illustrating an example that may occur when a fall-back mode is scheduled for a terminal being in a latency reduction mode.

As shown in FIG. 7, the terminal configured with the latency reduction mode may receive scheduling 707 in the CSS 703 of the subframe n 701 and operate at the n+4 timing in the fall-back mode. Then, the terminal may receive scheduling 727 in the USS 725 of subframe n+1 723 and operate at the n+3 timing. In this case, a conflict may occur where PUSCH transmissions 711 and 731 or HARQ-ACK transmissions for two scheduling are performed in the same subframe 743. Therefore, in order to solve this conflict, the base station that delivers scheduling in the CSS of a certain subframe to a specific terminal configured with the latency reduction mode to operate at the n+4 timing may not deliver, in the next subframe, scheduling for the operation at the n+3 timing. In the case where the base station operates as above, a method and an apparatus for detecting a downlink control signal so as to reduce power consumption may be provided for the terminal.

According to an embodiment of the present disclosure, the first search space may be used interchangeably with a cell-specific search space (CSS), and the second search space may be used interchangeably with a UE-specific search space (USS). In addition, the detection and the decoding may be used interchangeably.

The fall-back mode may be used when the base station configures the latency reduction mode for the terminal, and the fall-back mode may not be used in the normal mode. Also, the second signal corresponding to a downlink control signal may be HARQ-ACK for downlink data transmission scheduled by the control signal or be uplink data for uplink data transmission scheduling of the control signal.

Subframe n 701 may be referred to as the first subframe, and subframe n+1 723 may be referred to as the second subframe. Although the first subframe and the second subframe may be spaced apart in time according to the system configuration, embodiments may be described based on that the second subframe is located after the first subframe.

Figure 8:
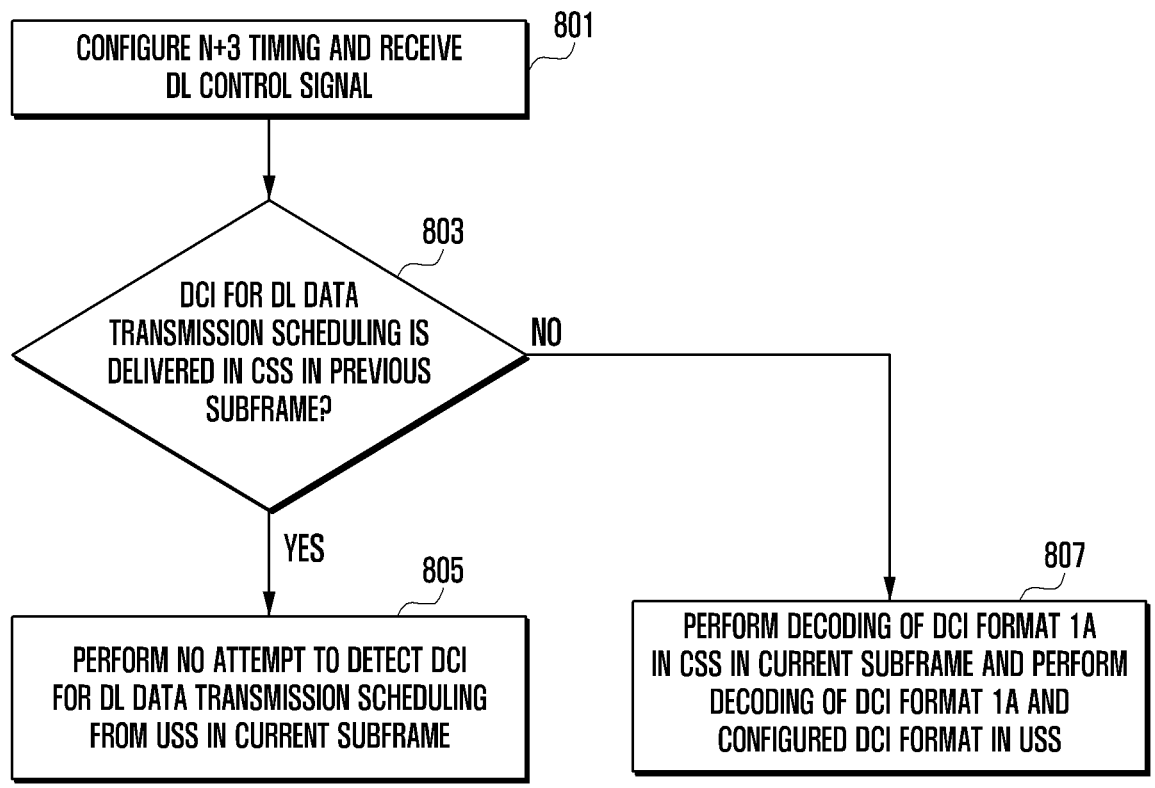
FIG. 8 is a flowchart illustrating an operation of a terminal, according to an embodiment.

A method in which a terminal configured with a latency reduction mode detects a downlink control signal having scheduling information for downlink data transmission will be described with reference to FIG. 8.

As previously described, when a base station configures the latency reduction mode for a terminal to transmit the second signal at the n+3 timing, the terminal may transmit the second signal at the n+4 timing when the downlink control signal is decoded in the first search space, and may operate in the fall-back mode to transmit the second signal at the n+3 timing when the downlink control signal is decoded in the second search space. However, if the search space in which the downlink control signal is decoded corresponds to the first search space and the second search space, related information may be configured explicitly or implicitly between the base station and the terminal so that the terminal determines the search space as the first search space or the second search space.

If the terminal configured with the latency reduction mode at step 801 detects control information for scheduling downlink data transmission from the first search space in subframe n at step 803, the terminal does not attempt to detect the control information for the downlink scheduling from the second search space in subframe n+1 at step 805. That is, at step 805, the terminal tries to detect the control information for the downlink scheduling from only the first search space in subframe n+1. If the terminal fails to detect the control information for scheduling the downlink data transmission from the first search space in subframe n at step 803, the terminal attempts to detect the control information for scheduling the downlink data transmission from both the first search space and the second search space at step 807. In this manner, the terminal can reduce the number of attempts to detect the control information in subframe n+1, thereby reducing power consumption. For example, when the terminal configured with the latency reduction mode is configured to attempt to detect the DCI format 1A and the DCI format 2, and when the terminal receives the downlink scheduling with the DCI format 1A in the first search space of the subframe n, the terminal attempts to detect the DCI format 1A from the first search space in the subframe n+1 and does not attempt to detect the DCI format 1A and DCI format 2 from the second search space. Although the description of this embodiment is based on the DCI format LA, this embodiment is not considered as a limitation and may be applied similarly to other DCI formats that can be detected in CSS and USS.

Figure 9:
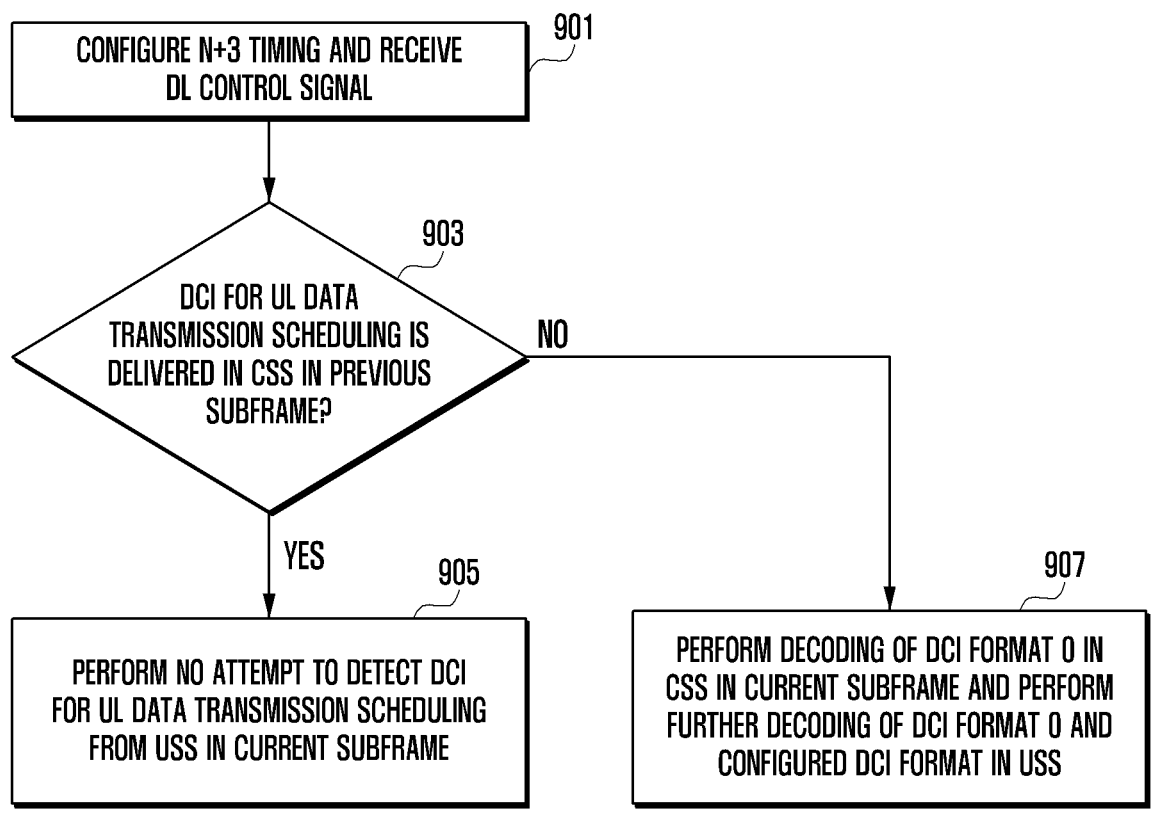
FIG. 9 is a flowchart illustrating an operation of a terminal, according to an embodiment.

A method in which a terminal configured with a latency reduction mode detects a downlink control signal having scheduling information for uplink data transmission will be described with reference to FIG. 9.

As previously described, when a base station configures the latency reduction mode for a terminal to transmit the second signal at the n+3 timing, the terminal may transmit the second signal at the n+4 timing when the downlink control signal is decoded in the first search space, and may operate in the fall-back mode to transmit the second signal at the n+3 timing when the downlink control signal is decoded in the second search space. However, if the search space in which the downlink control signal is decoded corresponds to the first search space and the second search space, related information may be configured explicitly or implicitly between the base station and the terminal so that the terminal determines the search space as the first search space or the second search space.

If the terminal configured with the latency reduction mode at step 901 detects control information for scheduling uplink data transmission from the first search space in subframe n at step 903, the terminal does not attempt to detect the control information for the uplink scheduling from the second search space in subframe n+1 at step 905. That is, at step 905, the terminal tries to detect the control information for the uplink scheduling from only the first search space in subframe n+1. If the terminal fails to detect the control information for scheduling the uplink data transmission from the first search space in subframe n at step 903, the terminal attempts to detect the control information for scheduling the uplink data transmission from both the first search space and the second search space at step 907. In this manner, the terminal can reduce the number of attempts to detect the control information in subframe n+1, thereby reducing power consumption. For example, when the terminal configured with the latency reduction mode is configured to attempt to detect the DCI format 0 and the DCI format 4, and when the terminal receives the downlink scheduling with the DCI format 0 in the first search space of the subframe n, the terminal attempts to detect the DCI format 0 from the first search space in the subframe n+1 and does not attempt to detect the DCI format 0 and the DCI format 4 from the second search space. According to an embodiment, the DCI format 0 may be a form including at least one of a HARQ process number and RV, and may be provided in the form of DCI format 0C, for example. However, this embodiment is not considered as a limitation and may be applied similarly to other DCI formats that can be detected in CSS and USS.

Figure 10:
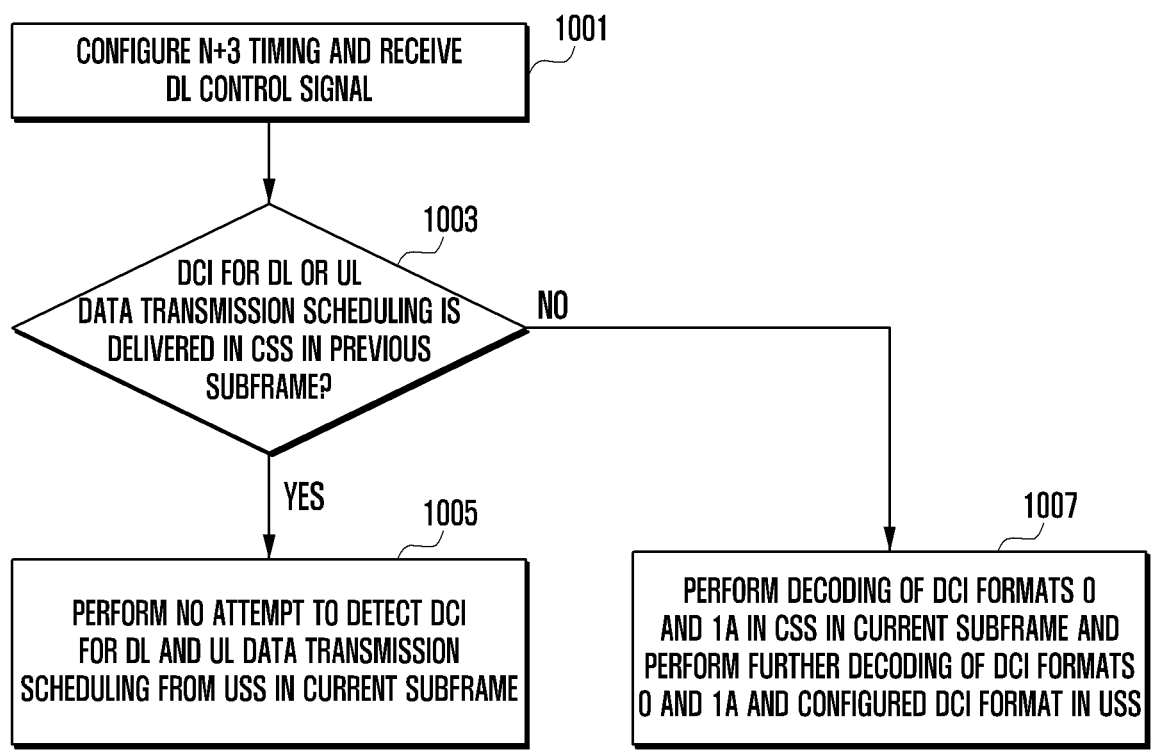
FIG. 10 is a flowchart illustrating an operation of a terminal, according to an embodiment.

A method in which a terminal configured with a latency reduction mode detects a downlink control signal having scheduling information for downlink and uplink data transmission will be described with reference to FIG. 10.

As previously described, when a base station configures the latency reduction mode for a terminal to transmit the second signal at the n+3 timing, the terminal may transmit the second signal at the n+4 timing when the downlink control signal is decoded in the first search space, and may operate in the fall-back mode to transmit the second signal at the n+3 timing when the downlink control signal is decoded in the second search space. However, if the search space in which the downlink control signal is decoded corresponds to the first search space and the second search space, related information may be configured explicitly or implicitly between the base station and the terminal so that the terminal determines the search space as the first search space or the second search space.

If the terminal configured with the latency reduction mode at step 1001 detects control information for scheduling uplink or downlink data transmission from the first search space in subframe n at step 1003, the terminal does not attempt to detect the control information for the uplink or downlink scheduling from the second search space in subframe n+1 at step 1005. That is, at step 1005, the terminal tries to detect the control information for the uplink or downlink scheduling from only the first search space in subframe n+1. If the terminal fails to detect the control information for scheduling the uplink or downlink data transmission from the first search space in subframe n at step 1003, the terminal attempts to detect the control information for scheduling the uplink or downlink data transmission from both the first search space and the second search space at step 1007. In this manner, the terminal can reduce the number of attempts to detect the control information in subframe n+1, thereby reducing power consumption.

For example, when the terminal configured with the latency reduction mode is configured to attempt to detect the DCI format 1A, the DCI format 2, the DCI format 0, and the DCI format 4, and when the terminal receives the downlink scheduling with the DCI format 1A in the first search space of subframe n, the terminal attempts to detect the DCI format 1A or the DCI format 0 from the first search space in subframe n+1 and does not attempt to detect the DCI format 1A, the DCI format 2, the DCI format 0, and the DCI format 4 from the second search space. Although this embodiment is based on the DCI format 1A for the control information for the downlink data scheduling, this embodiment is not considered as a limitation and may be applied similarly to other DCI formats that can be detected in CSS and USS. Also, according to an embodiment, the DCI format 0 for the control information for the uplink data scheduling may include at least one of a HARQ process number and RV, and may be provided in the DCI format 0C, for example. This embodiment is not considered as a limitation and may be applied similarly to other DCI formats that can be detected in CSS and USS.

Although in the above embodiments the operation of the latency reduction mode is described using the FDD system, the present disclosure can be applied even when the latency reduction mode is configured in the TDD system. When scheduling is to use the fall-back mode in a specific subframe and also when scheduling is to use the latency reduction mode in the subsequent subframe, the transmission timing of the second signal may overlap with respect to the scheduling. Therefore, the terminal does not decode a downlink control signal in a subframe in which the second signal transmission timing may overlap.

Although in the above embodiments the operation of the latency reduction mode is described to use the n+3 timing, the present disclosure can be applied when the latency reduction mode is configured to transmit the second signal at the n+2 or n+3 timing.

Figure 11:
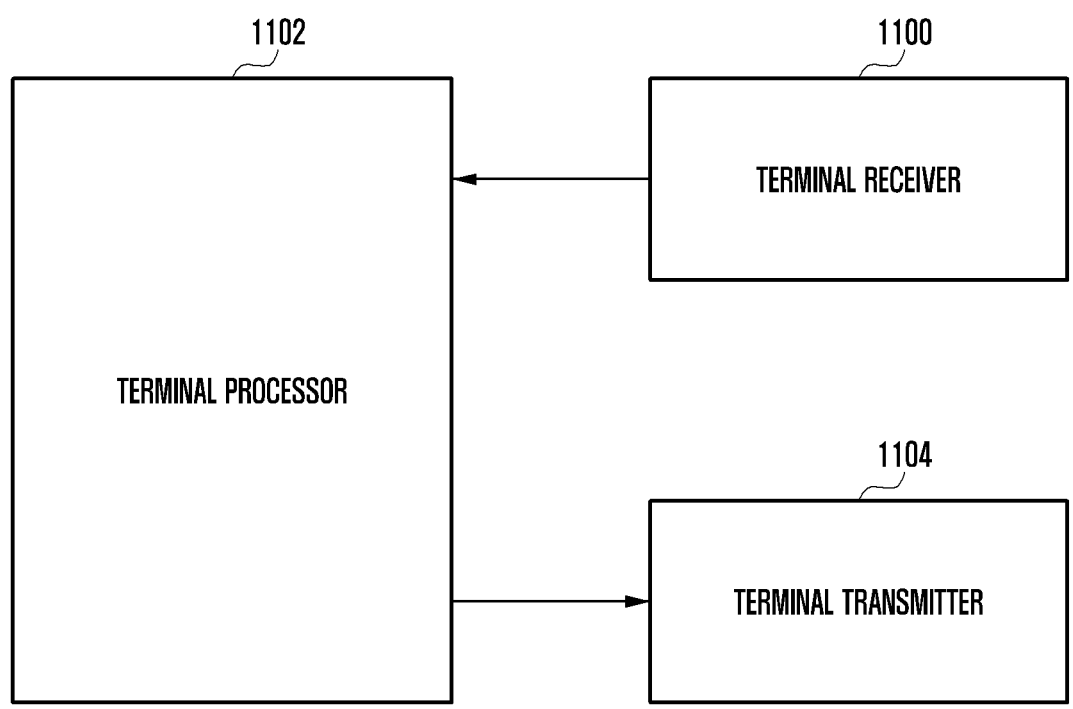
FIG. 11 is a block diagram illustrating a structure of a terminal, according to an embodiment.
Figure 12:
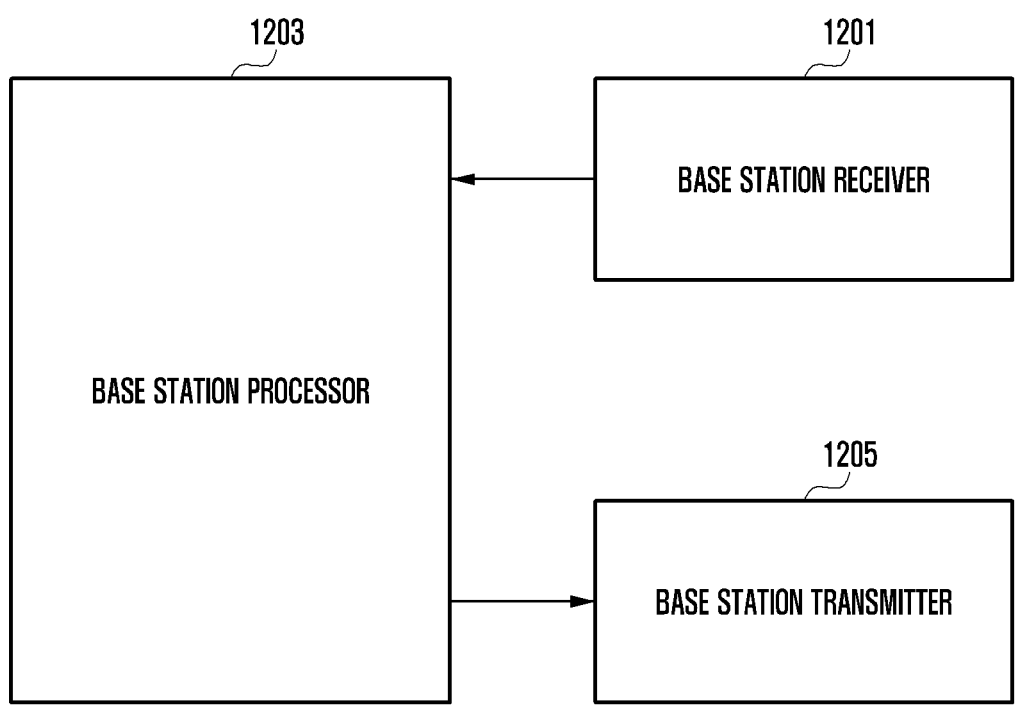
FIG. 12 is a block diagram illustrating a structure of a base station, according to an embodiment.

In order to implement the above-described embodiments of the present disclosure, a terminal and a base station may include a transmitter, a receiver, and a processor as shown in FIGS. 11 and 12, respectively. The above-described embodiments relate to transmission/reception methods of the base station and the terminal to perform the operation of a control signal detection method depending on a search space. To perform this operation, the transmitter, the receiver, and the processor of the base station and the terminal should be operated in accordance with the above embodiments.

Specifically, FIG. 11 is a block diagram illustrating an internal structure of a terminal, according to an embodiment. As shown in FIG. 11, the terminal may include a terminal receiver 1100, a terminal transmitter 1104, and a terminal processor 1102. The terminal receiver 1100 and the terminal transmitter 1104 may be collectively referred to as a transceiver, which may transmit and receive signals, such as control information and data, to and from a base station. The transceiver may include an RF transmitter for up-converting and amplifying the frequency of the transmitted signal, and an RF receiver for low-noise amplifying the received signal and down-converting the frequency. Also, the transceiver may receive a signal through a radio channel and then output the received signal to the terminal processor 1102, or transmit a signal, outputted from the terminal processor 1102, through a radio channel. The terminal processor 1102 may control a series of processes so that the terminal can operate in accordance with the above-described embodiments of the present disclosure.

For example, when the terminal receiver 1100 receives a signal including a control signal, the terminal processor 1102 may determine a DCI format for decoding depending on a search space and then control the decoding. In addition, the terminal processor 1102 may determine a search space from which a DCI is detected, and then determine the transmission timing of the second signal. Thereafter, if it is necessary to transmit the second signal related to a control signal at the above timing, the terminal transmitter 1104 transmits the second signal at the timing determined by the terminal processor 1102. The terminal processor 1102 may be referred to as a controller. The transceiver may transmit/receive a signal under the control of the controller. Also, according to an embodiment, the controller may include at least one processor.

FIG. 12 is a block diagram illustrating an internal structure of a base station, according to an embodiment. As shown in FIG. 12, the base station may include a base station receiver 1201, a base station transmitter 1205, and a base station processor 1203. The base station receiver 1201 and the base station transmitter 1205 may be collectively referred to as a transceiver, which may transmit and receive signals, such as control information and data, to and from a terminal. The transceiver may include an RF transmitter for up-converting and amplifying the frequency of the transmitted signal, and an RF receiver for low-noise amplifying the received signal and down-converting the frequency. Also, the transceiver may receive a signal through a radio channel and then output the received signal to the base station processor 1203, or transmit a signal, outputted from the base station processor 1203, through a radio channel. The base station processor 1203 may control a series of processes so that the base station can operate in accordance with the above-described embodiments of the present disclosure. The base station processor 1203 may be referred to as a controller. The transceiver may transmit/receive a signal under the control of the controller. Also, in some embodiments, the controller may include at least one processor.

The above-discussed embodiments of the present disclosure may be employed selectively or in combination as needed. For example, some embodiments may be combined at least partially to operate the base station and the terminal. Although the above embodiments are described on the basis of the LTE/LTE-A systems, other modified embodiments based on technical features of the above embodiments may also be applicable to and implemented in other systems such as 5G and NR systems.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method by a user equipment (UE) in a mobile communication system, the method comprising:
   receiving, from a base station, configuration information including information on a short processing time;
   receiving, from the base station, first downlink control information in a first subframe;
   identifying whether the first downlink control information is received in a common search space of the first subframe;
   skipping decoding of second downlink control information transmitted in a UE-specific search space of a second subframe, in case that the first downlink control information is received in the common search space of the first subframe; and
   transmitting, to the base station, hybrid automatic repeat request (HARQ) information corresponding to data received based on the first downlink control information in a third subframe corresponding to the first downlink control information.

2. The method of claim 1, further comprising:
   attempting to decode the third downlink control information transmitted in a common search space of the second subframe, in case that the first downlink control information is received in the common search space of the first subframe.

3. The method of claim 1, further comprising:
   attempting to decode the third downlink control information transmitted in the second subframe, in case that the first downlink control information is received in a UE-specific search space of the first subframe.

4. The method of claim 3, wherein a subframe offset between the first subframe and the third subframe is 3, in case that the first downlink control information received in the UE-specific search space of the first subframe.

5. The method of claim 1, wherein a subframe offset between the first subframe and the second subframe is 1, and wherein a subframe offset between the first subframe and the third subframe is 4.

6. A method by a base station in a mobile communication system, the method comprising:
   transmitting, to a user equipment (UE), configuration information including information on a short processing time;
   transmitting, to the UE, first downlink control information in a first subframe; and
   receiving, from the UE, hybrid automatic repeat request (HARQ) information corresponding to data transmitted based on the first downlink control information in a third subframe corresponding to the first downlink control information,
   wherein decoding of second downlink control information transmitted in a UE-specific search space of a second subframe is skipped, in case that the first downlink control information is received in a common search space of the first subframe.

7. The method of claim 6, wherein decoding of third downlink control information transmitted in a common search space of the second subframe is attempted.

8. The method of claim 6, wherein decoding of third downlink control information transmitted in the second subframe is attempted, in case that the first downlink control information is received in a UE specific search space of the first subframe.

9. The method of claim 8, wherein a subframe offset between the first subframe and the third subframe is 3, in case that the first downlink control information is received in the UE-specific search space of the first subframe.

10. The method of claim 6, wherein a subframe offset between the first subframe and the second subframe is 1, and wherein a subframe offset between the first subframe and the third subframe is 4.

11. A user equipment (UE) in a mobile communication system, the UE comprising:
    a transceiver; and
    at least one processor coupled with the transceiver and configured to:
      receive, from a base station, configuration information including information on a short processing time,
      receive, from the base station, first downlink control information in a first subframe,
      identify whether the first downlink control information is received in a common search space of the first subframe,
      skip decoding of second downlink control information transmitted in a UE-specific search space of a second subframe, in case that the first downlink control information is received in the common search space of the first subframe, and
      transmit, to the base station, hybrid automatic repeat request (HARQ) information corresponding to data received based on the first downlink control information in a third subframe corresponding to the first downlink control information.

12. The UE of claim 11, wherein the at least one processor is further configured to attempt to decode third downlink control information transmitted in a common search space of the second subframe, in case that the first downlink control information is received in the common search space of the first subframe.

13. The UE of claim 11, wherein the at least one processor is further configured to attempt to decode third downlink control information transmitted in the second subframe, in case that the first downlink control information is received in a UE-specific search space of the first subframe.

14. The UE of claim 13, wherein a subframe offset between the first subframe and the third subframe is 3, in case that the first downlink control information is received in the UE-specific search space of the first subframe.

15. The UE of claim 11, wherein a subframe offset between the first subframe and the second subframe is 1, and wherein a subframe offset between the first subframe and the third subframe is 4.

16. A base station in a mobile communication system, the base station comprising:
    a transceiver; and
    at least one processor coupled with the transceiver and configured to:
      transmit, to a user equipment (UE), configuration information including information on a short processing time,
      transmit, to the UE, first downlink control information in a first subframe, and receive, from the UE, hybrid automatic repeat request (HARQ) information corresponding to data transmitted based on the first downlink control information in a third subframe corresponding to the first downlink control information, wherein decoding of second downlink control information transmitted in a UE-specific search space of a second subframe is skipped, in case that the first downlink control information is received in a common search space of the first subframe.

17. The base station of claim 16, wherein decoding of third downlink control information transmitted in a common search space of the second subframe is attempted.

18. The base station of claim 16, wherein decoding of third downlink control information transmitted in the second subframe is attempted, in case that the first downlink control information is received in a UE-specific search space of the first subframe.

19. The base station of claim 18, wherein a subframe offset between the first subframe and the third subframe is 3, in case that the first downlink control information is received in the UE-specific search space of the first subframe.

20. The base station of claim 16, wherein a subframe offset between the first subframe and the second subframe is 1, and wherein a subframe offset between the first subframe and the third subframe is 4.

* * * * *